United States Patent Office 3,309,382
Patented Mar. 14, 1967

3,309,382
ORGANIC CARBONATING AGENT
Jacob R. Feldman, New City, N.Y., and Rodger L. Foltz, Columbus, Ohio, assignors to General Foods Corporation, White Plains, N.Y., a corporation of Delaware
No Drawing. Filed Apr. 30, 1965, Ser. No. 452,332
7 Claims. (Cl. 260—340.2)

This is a continuation in part of application Serial No. 244,372, filed Dec. 13, 1962, now abandoned.

This invention relates to a novel organic compound useful as a carbonating agent. More particularly the invention is concerned with production of an organic carbonating agent for foods and beverages and also for other applications calling or a stable form of carbonating material.

The art has long sought an edible carbonating agent capable of relatively instant hydrolysis upon addition to water but also possessing a thermal and moisture stability which allows the compound to retain its carbonating potential despite storage at temperatures above ambient conditions while being exposed to aggravating moisture conditions which can cause the carbonating agent to lose its power to carbonate. In the dry mix beverage art, for example, a pleasant tasting product which exhibits a controlled evolution of carbon dioxide is highly desirable. This art has long sought and failed to obtain such a compound. In the main, prior art workers have concentrated upon the employment of an "effervescent couple," i.e., the reaction of an inorganic alkali carbonate or bicarbonate and an acid to produce carbonation in aqueous solutions. This latter approach suffers from the common disadvantage of providing a saline aftertaste in the carbonated beverage. As is well known, this salinity stems from the presence of salt by-products produced during the evolution of carbon dioxide. Organic carbonating agents which do not suffer from this disadvantage and which are capable of hydrolysis in water to release $CO_2$ and non-saline byproducts, are either too slow to react with water as part of a dry beverage composition or due to their high rate of hydrolysis undergo premature decomposition to an unstable form of limited utility.

The present invention has as one of its principal objects therefore the provision of an agent which on hydrolysis will release $CO_2$ without at the same time producing an undesirable by-product which will detract from the taste or appearance of the carbonated beverage. This compound should be capable of relatively rapid reaction in the presence of reconstituting aqueous liquids while having improved stability under elevated temperature conditions. The compound should not undergo autolytic decomposition and thereby be rendered useless for carbonation purposes. Moreover, reaction with trace quantities of moisture should not produce insoluble degradation products which leave an undesirable residue in the reconstituting liquid.

While the invention has as its principal object the provision of a carbonating agent of the stated character which is useful in beverage compositions, the invention will be seen to be applicable to a variety of similar food, pharmaceutical and other applications calling for a compound capable of releasing carbon dioxide and other desired soluble by-products upon contact with an excess amount of water.

Other and more specific objects met by the discovery of the present invention will become apparent from the following description.

Essentially, this invention is founded upon the discovery of the compounds bis-O-carboxy tartaric anhydride and bis-O-carboxy glutaric anhydride. They may generally be represented by the following structural formula wherein $n$ is either 0 or 1:

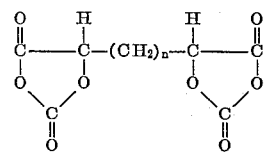

These compounds will dissolve and react almost instantly with an excess of water to produce $CO_2$ and tartaric acid or glutaric acid, respectively, without at the same time producing any unpleasant tasting residue. The compounds continue to produce carbon dioxide and tartaric or glutaric acid over a protracted period of time, thereby creating a sustained effervescence in the presence of water. Depending upon the level of usage and the final crystalline particle size employed, the compounds are capable of producing a saturated solution of carbon dioxide. Thus, the compounds are ideal dry carbonating agents for use in foods and beverages since they undergo relatively rapid reaction and continue to evolve carbon dioxide in the presence of water while avoiding the production of any unfavorable taste or residue in the aqueous liquid. The compounds lend themselves admirably to formulation of dry food and beverage compositions adapted for ready reconstitution in aqueous liquids. In aqueous liquids, they release the theoretically available amount of carbon dioxide, for example, about 44% of its weight in the case of the bis-O-carboxy tartaric anhydride and about 41% of its weight in the case of the bis-O-carboxy glutaric anhydride.

Advantageously and quite unexpectedly, although the compounds are highly reactive in producing carbon dioxide in an excess amount of reconstituting aqueous liquid, they are compatible with other dry beverage or food ingredients such as sugar, flavor, and color, and when packaged under substantially anhydrous conditions do not undergo autolytic release of the carbon dioxide to an extent which dissipates their efficacy as carbonating agents; this efficacy is retained even when the composition containing the compound is continually re-exposed to ambient conditions normally encountered in multiple servings of the product. Moreover, throughout the anticipated period of use, the carbonating agents do not hydrolyze to produce unsightly water-insoluble concomitants. In general, most food and beverage ingredients can be packaged along with the carbonating agents of the present invention in a conventional moisture-protective packaging material. The mechanism whereby the anhydrides possess this stability is not fully understood; however, it appears that this unexpected property stems from the ability of the compounds to avoid unlimited autolytic decomposition in the presence of trace quantities of moisture and also to avoid the production of water-insoluble polymers.

The dramatic tolerance of the bis-O-carboxy anhydrides of tartaric acid and dihydroxy glutaric acid to heat and trace amounts of moisture is evident upon comparison of these compounds to the carboxy anhydrides derived from other alpha-hydroxy acids such as the lactic and glycolic acid derivatives of carbonic acid. The O-carboxy anhydrides of the other alpha hydroxy acids undergo a loss of functionality after storage under the most ideal anhydrous storage conditions, i.e., less than 0.1% moisture available for reaction with the compound;

under the same conditions the bis-O-carboxy anhydrides of tartaric acid and glutaric acid remain relatively stable and release their theoretical $CO_2$ content in reaction with an excess of water. As distinguished from the former class of reactive organic carbonating agents representative of which is the O-carboxy anhydride of lactic acid, the bis-O-carboxy anhydride of tartaric acid does not produce unsightly insoluble degradation products or polymers which remain in the liquid after hydrolysis, but instead produces by-products which are water soluble in the beverage or other food preparation.

The compounds of this invention are white crystalline solids; the compounds per se have no apparent odor and hence are compatible with a variety of flavor and aroma formulations. Upon hydrolysis, the compounds release an edible food acid (tartaric or dihydroxy glutaric) which is also compatible with other food acids, food flavors and aromas. Thus, the compounds can be incorporated in dry fruit-flavored beverage mix formulations and due to their tolerance to moisture and heat can be dry blended or otherwise combined, e.g., in tablet or capsule form, with customary saccharides, acids and buffer salts. The tartness of the acid by-product or the carbonation in aqueous liquid is such as permits the compound to be used in non-fruit beverage flavor formulations of the cola and root beer type.

While the aforesaid unique properties of the carbonating agents render them eminently suitable for use in dry effervescent beverage compositions, the compounds can also be used in a number of other food applications wherein an autofoaming agent for initiating the evolution of a useful non-toxic gas is desired. In the food field this foaming property permits the product to be used as a leavening agent in the bakery art or as an aerating agent for foams and edible emulsions like chiffons, icings and toppings. Similarly, the compounds can be employed as an ancillary carbonating agent for the packaging of food compositions in useful convenient forms such as an "aerosol" food product which requires a propelling gas to dispense the container contents.

In the non-food field, the bicyclic organic compounds can likewise be employed in similar avenues of application where a foaming or blowing agent is required. Thus, the rapid hydrolysis of this carbonate in water lends itself to use in convenient beauty and household aid products, such as hair conditioners, shampoos, facial creams, bath salts, shaving creams, air fresheners and household cleaners containing detergent and abrasive cleansing and scouring compositions, etc.

*Example 1.—Preparation of the compound*

The bis-O-carboxy anhydride of tartaric acid can be synthesized by reacting the tartaric acid and phosgene (carbonyl dichloride) in a suitable solvent for these reagents. This reaction is carried out by maintaining the phosgene in solution and employing it in an amount in excess of the stoichiometric requirement. Ultimately the anhydride reaction product is isolated by crystallization techniques hereinafter described after unreacted phosgene and the solvent therefore are volatilized from the reaction liquor. The bis-O-carboxy tartaric anhydride can be derived in four stereo-isomeric forms which will correspond to the stereo-isomeric form of the specific tartaric acid from which anhydride is synthetized.

The synthesis of the various stereo-isomers may be represented as follows:

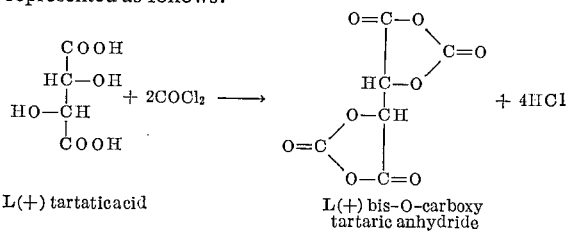

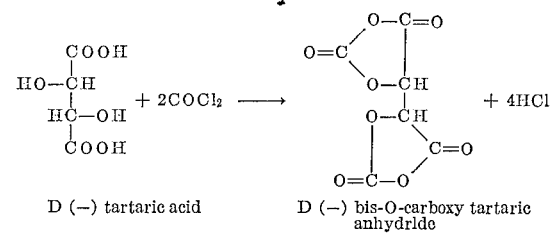

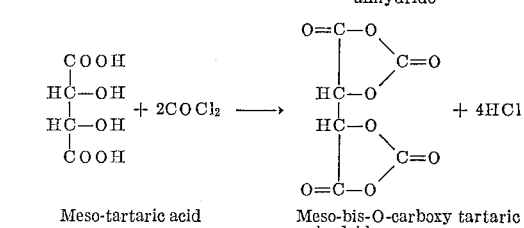

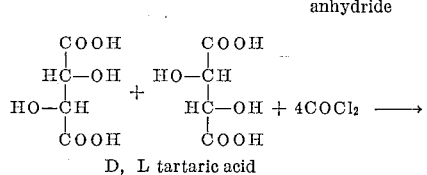

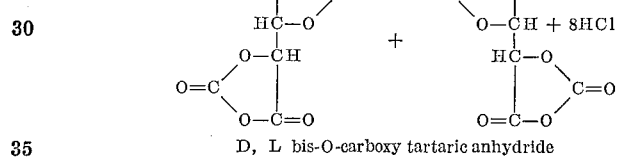

The compounds of this invention may be produced by reacting any one of the isomers of tartaric acid with phosgene after dissolution in a mutually compatible solvent. Preferably this reaction should be carried out under conditions wherein the tartaric acid and the phosgene are each placed in solution through a solvent such as tetrahydrofuran or its homologues. The reaction is then allowed to proceed at temperatures which minimize the production of undesirable side products which interfere with the reaction and cause difficult separation problems.

The mechanism of this reaction is believed to involve the initial production of a chloroformate intermediate of tartaric acid which is then cyclised to the bis-O-carboxy anhydrode of tartaric acid. In this reaction the phosgene is preferably employed in an excess of the molar or stoichiometric amount neded to react with the tartaric acid. While various reaction temperatures may be employed, it is preferable to initially combine the phosgene and tartaric acid in a suitable solvent at a temperature of 0° to 40° C., typically 0° to 20° C., and then allow the reaction to proceed by standing for 16 to 24 hours at ambient conditions. When tetrahydrofuran, or a homologue or derivative of tetrahydrofuran is used as the solvent, the reaction mixture is most preferably chilled in an ice bath at 0° to 5° C., allowed to warm up to 15° to 20° C. in 4–5 hours and then allowed to stand for a period of 12 to 16 hours at such temperature. Thereafter, the solvent and unreacted phosgene are distilled from the crude reaction product containing the bis-O-carboxy anhydride by using sub-atmospheric pressures and ambient or subambient temperatures. During this distillation step the bis-O-carboxy tartaric anhydride may precipitate or crystallize. It is further purified by washing in an aprotic solvent such as cold ethyl ether at which point it is suitable for food use, although it is preferably recrystallized to remove any small amounts of impurities.

As a specific example of the production of bis-O- carboxy tartaric anhydride, the synthesis of L(+) bis-O-carboxy tartaric anhydride from L(+) tartaric acid will be shown although it is understood that the various other stereo-isomers of tartaric acid may be used, i.e., D(−) tartaric, meso tartaric, and D,L tartaric.

Approximately 700 gms. (7.1 moles) of liquid phosgene were run into 400 ml. of anhydrous tetrahydrofuran previously cooled to 0° C. by means of an ice bath. To the stirred and cooled phosgene-tetrahydrofuran solution was added 125 gms. (0.83 mole) of anhydrous L(+) tartaric acid dissolved in 1000 ml. of tetrahydrofuran. The resulting reaction mixture was stirred for an additional hour while it was allowed to warm to 15°–20° C. The mixture was then kept at this temperature for approximately 16 hours. The resulting clear solution was subjected to reduced pressure and a temperature between 15°–20° C. until all of the tetrahydrofuran and the excess phosgene was distilled. The remaining yellow syrup was taken up in 200 ml. of dry ethyl ether, cooled in an ice-bath for 30 minutes and the resultant white crystalline precipitate was removed by filtration in a dry-box, washed with cold diethyl ether and dried in a vacuum oven at 40° C. and 20 mm. Hg pressure for 6 hours. The resulting crystalline product was shown to be L(+) bis-O-carboxy tartaric anhydride by means of its elemental analysis, molecular weight, $CO_2$ evolution on contact with water and its infrared and nuclear magnetic resonance spectra and its optical rotation.

*Proof of structure*

The elemental analysis of the bis-O-carboxy tartaric anhydride was shown to coincide with its theoretical elemental analysis of 35.7% carbon, 1.0% hydrogen and 63.3% oxygen.

The molecular weight of the compound was determined by the cryoscopic method using benzene as the solvent (lowering the freezing point) and found to be 210 compared to a theoretical molecular weight of 202. The molecular weight of the compound as determined by osmometry (depressing the vapor pressure of the solvent) was found to be 225 compared to a theoretical of 202.

The bis-O-carboxy tartaric anhydride was found to release $CO_2$ and tartaric acid in the presence of excess water. Reconversion to tartaric acid and $CO_2$ gas was confirmed by isolating the calcium salt of tartaric acid from its aqueous solution while the $CO_2$ gas was passed through a lime solution to yield calcium carbonate. Treatment of the tartaric derivative with methyl alcohol was found to give dimethyl tartrate and $CO_2$ as the reaction products.

$CO_2$ evolution on contact with water was measured by two methods, i.e., a simple measurement of the loss of weight after addition to water and measurement of the volume of gas given off when water is added to the tartaric acid derivative. A loss of weight according to the first method was found to be 43.5% compared to 43.6% of the theoretical weight loss. The second method gave a gas volume of better than 99% of the theoretical.

The infra-red spectra curves for the various stereo-isomers, i.e., the L(+), D(−), meso, and D,L tartaric acid reveal spectra entirely consistent with the proposed structure. The spectra of these compounds as typified by the L(+) bis-O-carboxy tartaric anhydride show a peak doublet at 5.27 microns and 5.29 microns and a strong peak at 5.47 microns. These peaks have been observed in other cyclic ortho-carboxy anhydrides of alpha-hydroxy acids and are attributed to the presence of a 5 membered cyclic O-carboxy anhydride. The infra-red spectra of the compounds were analyzed as a 2% solution of the compound in acetonitrile in a cell having a 0.1 mm. cell thickness in the sample beam compared to the solvent in a similar cell in the reference beam.

The nuclear magnetic resonance spectrum of the L(+) derivative showed a single peak occurring at 252.9 c.p.s. downfield from the solvent resonance signal (acetone) at 60 mc./sec.; this is consistent with the two equivalent protons in the compound.

The D(−), the D,L and the meso derivatives all had infra-red and nuclear magnetic resonance spectra consistent with the structure of bis-O-carboxy tartaric anhydride.

The optical rotation of the various stereo-isomers of the bis-O-carboxy derivatives of tartaric acid was determined by dissolving the compound in ethyl acetate to form a 2% solution of the compound. The specific rotation was read in a 2 decimeter tube using the D line of sodium and determined to be as follows:

| L(+) tartaric | D(−) tartaric | Meso tartaric | D,L tartaric |
|---|---|---|---|
| 162° | −162° | 0° | 0° |

It can be seen that the above data are consistent with the structures proposed for bis-O-carboxy tartaric anhydride compounds.

All of the stereo or optical-isomers of bis-O-carboxy tartaric anhydride conform to the following general structural formula:

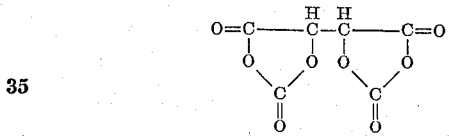

BEVERAGE FORMULATION

| Ingredients | Grams | Percent | Grams | Percent |
|---|---|---|---|---|
| Sugar | 34.10 | 93.2 | 34.10 | 87.3 |
| L(+) bis-O-carboxy tartaric anhydride | 1.68 | 4.5 | 2.18 | 5.3 |
| Sodium bicarbonate | 0.48 | 1.3 | | |
| Tri-sodium phosphate | | | 2.50 | 6.5 |
| Starch | 0.30 | 0.8 | 0.31 | 0.7 |
| Flavor and Color | 0.007 | 0.2 | 0.007 | 0.2 |
| Dry Beverage Mix | 36.57 | 100 | 39.09 | 100 |

L(+) bis-O-carboxy tartaric anhydride having an average crystalline particle size of 15–30 microns was thoroughly blended with the sugar, spray-dried sodium bicarbonate or tri-sodium phosphate, and remaining ingredients under substantially anhydrous processing conditions of less than 2% relative humidity (nitrogen atmosphere) and packaged in screw cap jars to assure a moisture level of less than 0.1% in the final formulation. The small jars were then stored for 3–6 months at 43° C. (110° F.) and at the end of this period the formulations were still found to contain above 95% of the theoretical $CO_2$. The product was still highly spoonable and crystalline in appearance with no evidence of unsightly degradation products being present. Similar samples were stored at ambient conditions of 21° C. (70° F.) and 50% relative humidity and subjected daily for several minutes to ambient conditions over a two week period. At the end of this period the formulations contained above 75% retention of the theoretical $CO_2$.

The retention of the $CO_2$ of the above compound was compared with that of D,L,O-carboxy lactic anhydride (prepared by the reaction of D,L lactic acid with phosgene in the persence of suitable solvent). In the following table the lactic acid derivative was substituted for the tartaric derivative in the above beverage formulations:

| Carbonating Compound | Percent Retention of Theoretical $CO_2$ After Storage | | | |
|---|---|---|---|---|
| | 2 Weeks | 4 Weeks | 12 Weeks | 24 Weeks |
| D,L-O-carboxy lactic anhydride | 50 | 31 | 25 | 21 |
| L(+) bis-O-carboxy tartaric anhydride | 95 | 95 | 95 | 95 |

The above formulations were also compared under storage conditions wherein the containers were opened daily over a two week period and subject to ambient atmospheric moisture, i.e., 21° C. and 50% relative humidity, for several minutes. The tartaric derivative was found to retain above 75% of its theoretical $CO_2$ while the lactic derivtive retained less than 25% of its theoretical $CO_2$. The lactic acid derivative also appeared to have formed water-insoluble degradation products.

About 35 grams of each of the above packaged formulations, i.e., packaged formulation containing the tartaric acid derivative stored for 3–6 months, the 2 week (daily opened) formulation containing the tartaric derivative, the 3–6 month anhydrously packaged formulation containing the lactic acid derivative, and the 2 week (daily opened) formulation containing the lactic derivative, were gently stirred into 6.5 ounces (195 ml.) of cold water (5° C.). Both of the samples containing the tartaric acid derivative dispersed uniformly and discretely into the beverage solution and began to evolve $CO_2$ immediately as well as after about 30 seconds and continued to evolve $CO_2$ after 10–15 minutes of standing. The formulations were completely dissolved in the beverage liquid after about 3 minutes to give a clear, sparkling, effervescent beverage containing very small bubbles of gas which slowly rose to the beverage surface. The tartaric acid derivative formulations released about 2.3 volumes of $CO_2$ in the case of the anhydrously stored samples and about 1.9 volumes of $CO_2$ in the non-anhydrously stored samples. $CO_2$ retention in both cases was about 1.5 volumes of $CO_2$ per volume of water solution (STP). The effective $CO_2$ retention in both samples was at saturation level and gave a carbonation sensation similar to commercially bottled beverages. The beverage solution was completely devoid of any discernible salinity and evidenced no undesirable residue of insoluble polymers in the beverge solution. The lactic acid derivative samples in contrast to the above gave little carbonation on addition to water and were incapable of complete dissolution in the beverage solution. Both samples were characterized by the presence of unsightly floaters on the surface of the beverage liquid and insoluble gum particles in the body of the beverage solution.

From the above, it is apparent that the L(+) bis-O-carboxy tartaric anhydride is clearly a superior carbonating agent to other known compounds. While the L(+) tartaric derivative is shown in the specific example, the other stereo-isomers of the tartaric derivative can be substituted for the L(+) derivative while achieving identical results.

In making the beverage formulation it is important to note that the crystal size of the tartaric acid derivative is an important factor in determining the rate of $CO_2$ evolution of the compound upon contact with an excess amount of water. For example, it is deemed preferable for the above formulations to use crystals wherein 90% of the particles by weight have a size less than 100 microns and greater than 10 microns, with the majority by weight of the crystals having a size less than 60 microns. Most preferably a majority by weight of the crystals of the carbonating compound should range between 20 and 60 microns. A range of particle sizes can be selected to provide carbonation at the instant of addition as well as at 3–10 minutes following addition. For example, this particle size distribution may comprise average particle sizes wherein 10% of the particles are less than 10 microns, 60% are 20–30 microns and 30% are 30–100 microns. By selecting a suitable particle size distribution a beverage solution can be produced having a predetermined carbonation potential capable of being released over a selected period of time.

The following formulation illustrates the preparation of a lime sherbert utiliizng the compound of this invention:

| Ingredients | Grams | Percent |
|---|---|---|
| Sugar | 125.0 | 74.5 |
| Lime Flavor | 0.7 | 0.4 |
| Lime Color | 0.4 | 0.2 |
| Salt | 0.1 | 0.1 |
| Guar Gum | 2.5 | 1.5 |
| Egg Albumin | 8.0 | 4.8 |
| Citric Acid | 1.5 | 0.9 |
| Confectionary Sugar | 25.0 | 14.9 |
| Sodium Bicarbonate | 1.5 | 0.9 |
| D,L bis-O-carboxy tartaric anhydride | 3.0 | 1.8 |
| Lime Sherbert Mix | 167.7 | 100 |

The guar gum and egg white ingredients are blended and then added to a mixing bowl containing the dry ingredients. Approximately a ¾ cup of warm water is added to the mixing bowl and the ingredients are mixed with vigorous hand-stirring for about 4 minutes and then poured into ice cube trays for quick freezing. The resultant product is an aerated sherbert having good flavor and color.

The following example relates to using the compound of this invention as a propellent:

| Ingredients | Grams | Percent |
|---|---|---|
| Heavy Cream | 96.0 | 96.0 |
| Meso bis-O-carboxy tartaric anhydride | 2.4 | 2.4 |
| Sodium Bicarbonate | 1.6 | 1.6 |
| | 100.0 | 100 |

The above ingredients were added to a 12 ounce aerosol can which was immediately sealed after placing a foam nozzle and valve on the can. After one hour of storage at refrigerator temperature the can dispensed a suitably aerated whipped cream of acceptable taste, texture and appearance.

*Example II*

According to the procedure described in the foregoing example, bis-O-carboxy glutaric anhydrides was prepared by reacting dihydroxy glutaric acid with phosgene. 10 g. (0.12 equivalent) of mesa 2,4-dihydroxy glutaric acid were suspended in 250 ml. of tetrahydrofuran and placed in a one liter, 3-necked flask equipped with a gas inlet tube, stirrer, thermometer and Dry Ice condenser. The mixture was cooled to 5° C. in an ice bath and 99 g. (1.0 mole) of phosgene were added through the inlet tube. The mixture was stirred for 4 hours while being maintained in an ice bath. The stirring was then stopped, the mixture removed from the ice bath and allowed to stand overnight. The following morning, the mixture was stired for 4 hours while at room temperature and then filtered through a sintered glass funnel to remove undissolved material. Less than 0.5 g. were removed in this manner. The tetrahydrofuran was removed from the filtrate in a rotary vacuum evaporator under 25–30 mm. of mercury and a bath temperature of 25° C.

The filtrate was a clear, yellow, oily residue. The addition of 30 ml. of ethyl ether to the clear yellow oily residue caused a fine white precipitate to form.

The precipitate was filtered and washed with additional ether in a dry atmosphere. The yield of meso bis-O-carboxy glutaric anhydride was 4 g. amounting to 31% of the theoretical quantity.

The compound was in the form of a tetragonal octahedron. It had no sharp melting point but started to char at about 180° C. It was insoluble in hydrocarbons, halogenated solvents and ethyl ether. It was soluble in tetrahydrofuran, ethyl acetate and acetonitrile. It could be recrystallized by dissolving in ethyl acetate and precipitating with ethyl ether.

On reaction with water, 216 mg. (1 millimole) of this material yielded 49 ml. (2 millimoles) of carbon dioxide at 24° C. The infra-red spectrum, obtained as a 2% solution in acetonitrile, was similar to that for bis-O-carboxy tartaric anhydride.

What is claimed is:

1. A bis-O-carboxy anhydride having the structural formula:

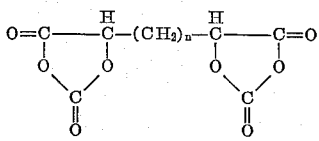

wherein $n$ is a whole integer having a value from 0 to 1.

2. Bis (1,3-dioxolane-2,4-dione-5-yl).
3. Bis (1,3-dioxolane-2,4-dione-5-yl) methane.
4. L(+) bis-(anhydro-O-carboxy) tartaric acid having the following structural formula:

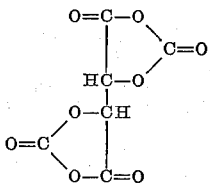

5. D(—) bis-(anhydro-O-carboxy) tartaric acid having the following structural formula:

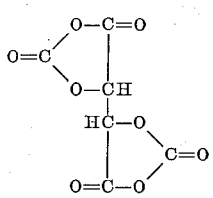

6. Meso-bis-(anhydro-O-carboxy) tartaric acid having the following structural formula:

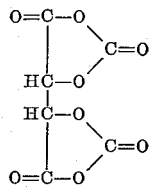

7. A racemic mixture of D,L bis-(anhydro-O-carboxy) tartaric acid represented by the following structural formula:

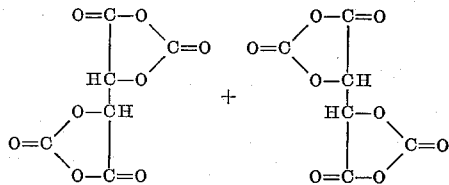

References Cited by the Examiner

Roth et al.: Helvetica Chim., Acta., vol. 47 (6), pp. 1621–5 (1964).

WALTER A. MODANCE, *Primary Examiner.*

N. S. MILESTONE, *Assistant Examiner.*